United States Patent [19]

Horansky et al.

[11] Patent Number: 5,022,692
[45] Date of Patent: Jun. 11, 1991

[54] SPRING MOUNTED MOLDING FOR A VEHICLE

[75] Inventors: John Horansky, Troy; Thomas J. Butkovich, Southfield, both of Mich.

[73] Assignee: Chrysler Corporation, Highland Park, Mich.

[21] Appl. No.: 451,701

[22] Filed: May 29, 1990

[51] Int. Cl.⁵ ............................................. B60R 19/42
[52] U.S. Cl. .................................. 293/128; 293/126; 293/135; 293/136; 267/160
[58] Field of Search ............... 293/126, 128, 132, 135, 293/136; 267/139, 160

[56] References Cited

U.S. PATENT DOCUMENTS 4,629,232 12/1986 Zimlich et al. ..................... 293/128
4,700,977 10/1987 Hlavach .......................... 293/128 X
4,753,467 6/1988 De Caluwe et al. ............ 293/128 X Primary Examiner—Margaret A. Focarino
Assistant Examiner—Andrew C. Pike
Attorney, Agent, or Firm—Edward A. Craig

[57] ABSTRACT

A spring mounted molding is provided for a vehicle on the body adjacent to a wrap-around end portion of the bumper. The molding and end portion of the bumper have mating cam surfaces. When the bumper moves towards the vehicle upon impact, the mating camming surfaces interact causing the molding to be deflected outwardly and the end portion of the bumper to slide therebeneath thus avoiding damage to the parts. Upon retraction of the bumper to its normal position, the spring mounting causes the molding to return to its normal position lying against the body of the vehicle.

5 Claims, 2 Drawing Sheets

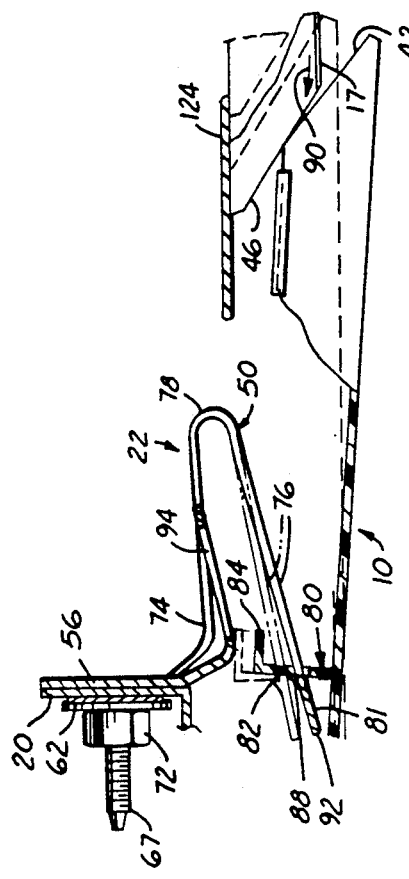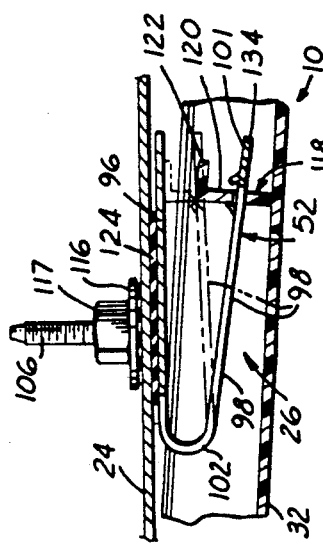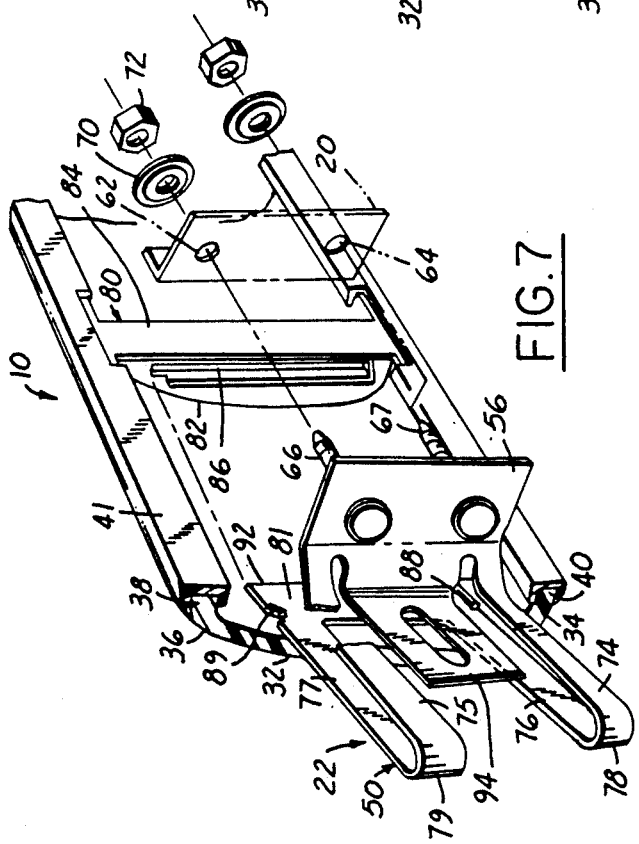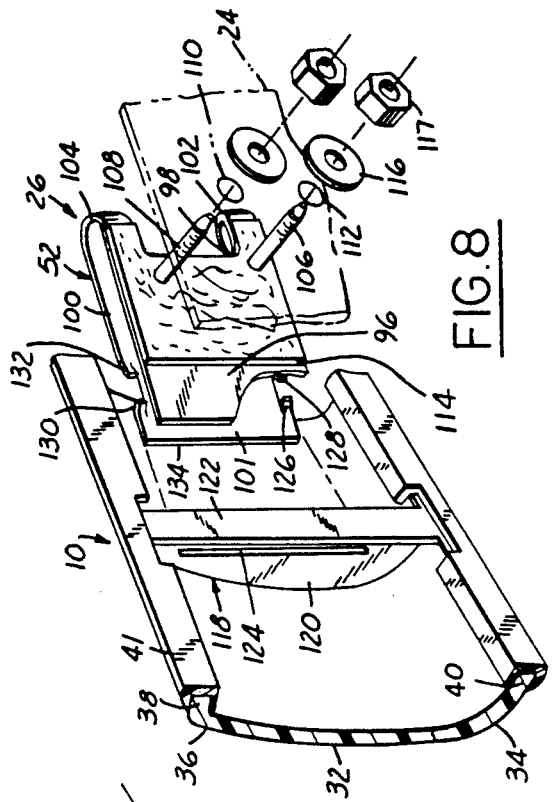

SPRING MOUNTED MOLDING FOR A VEHICLE

BACKGROUND OF THE INVENTION

Government regulations have mandated that front and rear bumpers of vehicles be so constructed and mounted as not to be damaged as a consequence of low speed impact with other vehicles or fixed structures. The prevailing method for accomplishing this has been to mount the bumper onto the vehicle by means of an energy absorbing device, such as a shock absorbing structure. When the bumper is impacted at low speeds, the energy absorbing device collapses, absorbing the energy of impact. This collapse takes with it the bumper which moves towards the vehicle. After being impacted, the energy absorbing devices bias the bumper back to its normal position.

One problem which has been encountered in connection with such structures is the maintenance of the integrity of moldings typically provided on the fenders of vehicles adjacent to and in-line with wrap-around end portions of the bumpers which extend around the sides of the vehicles. As the bumper is moved toward the vehicle, the wrap-around end portions also, of course, move. These end portions will impact moldings which are mounted on the fenders closely adjacent thereto. If the moldings are rigid pieces, and rigidly mounted, they will be damaged upon impact with the end portions of the bumper.

One solution to this problem has been the use of flexible moldings. When such moldings are impacted, they deform without damage. Upon retraction of the bumper after impact, such moldings may be straightened out by hand or may return to normal positions as a consequence of inherent resiliency.

It has been desired to use a molding fabricated of rigid material. Such a molding will not, of course, flex upon being impacted by an end portion of a bumper. It is necessary that such a rigid molding not be damaged by the bumper upon impact. In accordance with these needs, spring mounting means are provided for a molding in accordance with the present invention to permit outward deflection of the molding upon bumper movement, with the end portions of the bumper sliding beneath the molding thereby avoiding damage.

A similar construction is disclosed in U.S. Pat. No. 4,629,232. The present invention constitutes an improvement thereover in providing a simplified structure which is less costly and easier to assemble.

SUMMARY OF THE INVENTION

A spring mounted molding for a vehicle having a body and a bumper mounted on one of the forward and rearward ends thereof is provided. Energy absorbing structure is provided to mount the bumper to the vehicle. The energy absorbing structure biases the bumper to a normal position but permits movement of the bumper toward the vehicle upon impact. The bumper has an end portion extending around a side of the vehicle body. The spring mounted molding comprises a relatively rigid element having an underside and an exterior side. Spring means are provided on the underside of the molding. The spring means are connected between the molding and vehicle with the molding lying on the exterior of the vehicle body in alignment with, and adjacent to, the bumper end portion. The spring means biases the molding closely adjacent to the vehicle body. The molding has a camming surface adjacent to the bumper end portion. The bumper end portion has a mating camming surface adapted to contact the molding camming surface and move to the underside of the molding when the bumper is moved towards the vehicle upon impact, with the molding moving away from the vehicle body against the action of the spring means. The spring means is effective to bias the molding back to its original position upon retraction of the bumper end portion.

DESCRIPTION OF THE DRAWINGS

FIG. 5 is a view illustrating the left-hand portion of the molding as viewed in FIG. 2 after it has been deflected by the front bumper;

FIG. 6 is a view of the right-hand portion of the molding as viewed in FIG. 2 after it has been deflected by the front bumper;

FIG. 7 is an exploded view of the spring mounting assembly for the right-hand portion of the molding as viewed in FIG. 2; and FIG. 8 is an exploded view of the spring mounting assembly for the left-hand portion of the molding as viewed in FIG. 2.

DESCRIPTION OF THE PREFERRED EMBODIMENT

Figure 1:
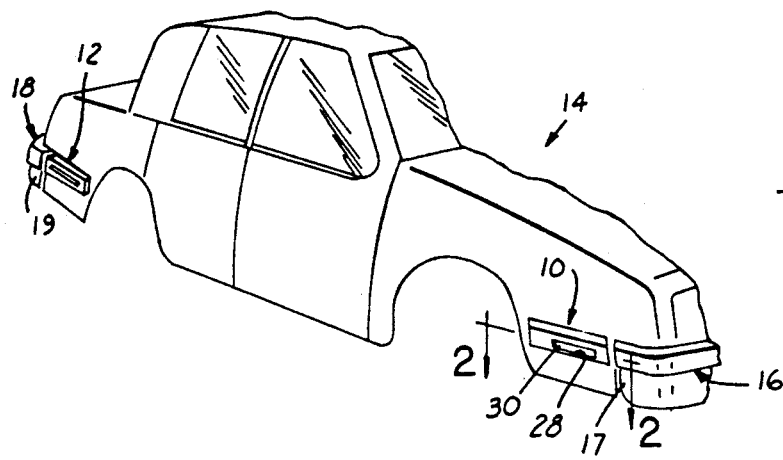
FIG. 1 is a view in perspective of a portion of a car with the spring mounted molding forming one embodiment of the present invention illustratively mounted on the righthand front and rear fenders.

Referring to FIG. 1, it will be noted that spring mounted vehicle moldings 10, 12 in accordance with the present invention are mounted on the sides of the front and rear right fenders of an automobile 14. Mirror image moldings are mounted on the opposite or left-hand side of the automobile 14. The front molding 10 and rear molding 12 have substantially the same construction and therefore only the front molding 10 will be described in detail. It will be noted that each molding is mounted in line with and adjacent to the end portions 17, 19 of front bumper element 16 and rear bumper element 18. These portions extend around the side of the vehicle.

The bumper elements are mounted on the automobile 14 for movement relative to the automobile body upon impact. As is conventional, energy absorbing devices 21 (shown diagrammatically), such as shock absorbers, are provided to mount and bias the bumper elements in a normal position such, for example, as illustrated in U.S. Pat. Nos. 3,937,508 and 4,059,301. The specific type of energy absorbing device is not germane to the present invention, the present invention functioning with various styles of such devices. The energy absorbing devices permit movement of the bumper a short distance towards the vehicle on which they are mounted after a low speed impact with another vehicle or stationary structure without appreciable damage to the bumper structure. After the impacting force is dissipated, the bumper structure is returned to its original position by the energy absorbing devices. Such bumper mounting constructions are common in the automotive industry at this time.

Figure 2:
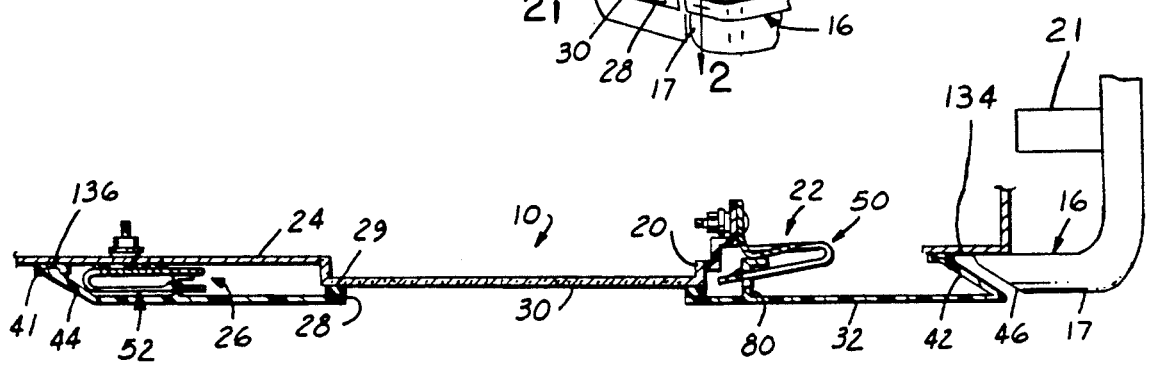
FIG. 2 is a sectional view taken substantially along the line 2—2 of FIG. 1 looking in the direction of the arrows.

The spring mounted moldings of the present invention are designed to accommodate limited bumper motion without damage to the molding. As shown in FIG. 2, the portion of the molding 10 adjacent to the front bumper element end portion 17 is mounted to body structure 20 by means of a spring mechanism 22. The portion of the molding 10 which is remote from the bumper end portion 17 is mounted to automobile body structure 24 by means of spring mechanism 26.

The molding 10 is a relatively rigid trim piece designed to stylistically merge with the front bumper element 16. The molding 10 includes a rectangular opening 28 which surrounds a lens 30, usually amber in color, which is mounted on the automobile body structure. A rubber-like isolation molding 29 is adhered to the molding 10 around the opening 28. A lamp is normally provided behind the lens to illuminate the lens when the vehicle lights are energized. Such lamps are commonly referred to as "fender marker lamps" and the molding 10 as a "marker surround".

The molding 10 may be fabricated as, for example, an injection molded plastic element. The molding 10 is elongated in the direction of the length of the automobile 14. It includes an exterior side comprising an outer wall portion 32 from the sides of which depend side wall portions 34, 36 which space the outer wall portion 32 from the automobile body structure. The side wall portions 34, 36 terminate in flange portions 38, 40 which may be seen in FIGS. 7 and 8. As will be noted, an isolation molding strip 41 is provided along the flange portions 38, 40 of the molding 10 on the underside thereof to isolate it from the surface of the automobile body. The strip 41 may be fabricated of, for example, PVC.

The end of the molding 10 adjacent to the bumper end portion 17 is provided with an end section 42. The end of the molding 10 remote from the bumper element 16 is closed by means of portion 44. The end section 42 extends at an angle outwardly and towards the bumper end portion 17. The bumper end portion 17 has a similar wall 46 which is reversely angled. In operation, the faces of portions 42, 46 function as mating camming surfaces at such times as bumper element 16 is moved towards the molding 10 upon impact of the bumper. The camming action which results causes the molding 10 to be pivoted out of the way of the bumper end portion 17 as will be later described. As will be noted in FIG. 2, a space is provided between the wall portions 42, 46. This space accounts for a portion of the bumper stroke. Typically, the space may be about 0.750 inch.

The spring mechanisms 22 and 24 will next be described. Each spring mechanism includes a spring clip 50, 52 which may be fabricated of spring steel. Each spring clip includes spring arm structure which may be characterized as flat spring means.

The spring mechanism 22 includes the spring clip 50 which is secured to fixed body structure 20. The spring clip 50 includes a mounting portion 56. Openings 62, 64 are provided in body structure 20. Threaded studs 66, 67 are secured to portion 56. The studs extend through the openings 62, 64. Washers 70 and nuts 72 are received on the studs and tightened to hold the clip 50 in place.

The spring clip 50 is constructed of two pairs of spaced apart spring arms 74, 75 and 76, 77 formed together by webs 78, 79 to define a substantially U-shaped flat spring member. Spring arms 74, 75 extend from portion 56 forwardly of the molding 10. Spring arms 74, 75 are connected to spring arms 76, 77 by the webs 78, 79. Spring arms 76, 77 extend from the webs 78, 79 rearwardly of the molding 10 and are connected at their outer ends by spring section 81.

A first spring mounting structure 80 is molded integrally with the molding 10 on the underside at the forward or bumper end portion thereof and extends transversely of the molding. The structure 80 is L-shaped and includes one wall 82 which extends from the outer wall portion 32 at substantially right angles thereto. A second wall 84 extends at right angles from the outer edge of the first wall 82 towards the bumper end portion 17. A transverse slot 86 is provided in the first wall 82. Spring arm section 81 extends through the slot 86. A pair of tangs 88, 89 are provided along the side edges of the spring arm section 81 adjacent to the outer end edge 92. The tangs 88, 89 are angled outwardly from the spring arm section 81 towards the webs 78, 79. Consequently, while the tangs will deflect to permit insertion of spring arm section 81 into slot 86, the tangs will thereafter spring back and prevent withdrawal of spring arm section 81 inasmuch as they will impinge against the wall 82. The portions of the spring arms 76, 77 between the tangs and the web are free to slide in the slot 86. This is important with respect to operation of the device which will be described hereinafter.

As will be noted in FIG. 6, the spring arms 74, 75 are out of contact with the wall 84. It is desirable to provide spring contact with the wall 84 in order to stabilize the molding 10 against vibratory movement and to inhibit sliding. Therefore, a spring section 94 is provided extending from portion 56 from a point beneath the arms 74, 75 forwardly of the molding 10. The spring section 94 contacts the wall 84 to result in the desired spring contact.

The other spring mechanism 26 is constructed similarly to the spring structure 22. The spring clip 52 is constructed of a spring arm 96 joined to a pair of spaced apart spring arms 98, 100 by webs 102, 104 to define a substantially U-shaped flat spring member. The spring arms 98, 100 are joined together at their outer ends by spring arm section 101. A pair of threaded studs 106, 108 extend from spring arm 96 through openings 110, 112 in body structure 24. A gasket 114 is provided between spring arm 96 and body structure 24. Washer and nut structures 116, 117 are received on studs 106, 108 to thereby secure the spring clip 52 to body structure 24. The location of the studs is such that the spring arm can't flex.

A second spring mounting structure 118 is molded integrally with the molding 10 on the underside thereof at the rearward end remote from the bumper end portion. The structure 118 extends transversely of the molding 10. The structure 118 is L-shaped and includes one wall 120 which extends from the outer wall portion 32 at substantially right angles thereto. A second wall 122 extends at right angles from the outer edge of the first wall 120 away from the bumper end portion 17. A transverse slot 124 is provided in the first wall 120. Spring arm section 101 extends through the slot 124. A pair of oppositely disposed spaced apart tangs 126, 128 and 130, 132 are provided along the side edges of spring arms 98, 100 and the spring arm section 101 adjacent to the outer end edge 134. The tangs 126, 128 and 130, 132 are angled outwardly from the spring structure towards each other. The tangs 126, 130 will deflect to permit insertion of spring arm section 101 into slot 124. These tangs will thereafter spring back and will impinge against the wall 120. The other tangs 128, 132 impinge against the other side of wall 120. The spring arms 98, 100 thus cannot slide in slot 124.

Figure 3:
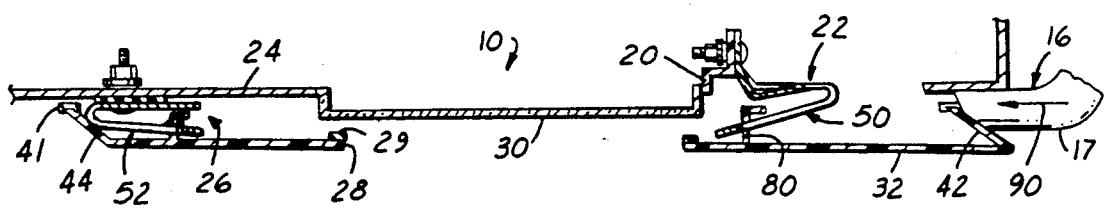
FIG. 3 is a view similar to FIG. 2 with the front bumper moved into a position where it contacts the front fender spring mounted molding.
Figure 4:
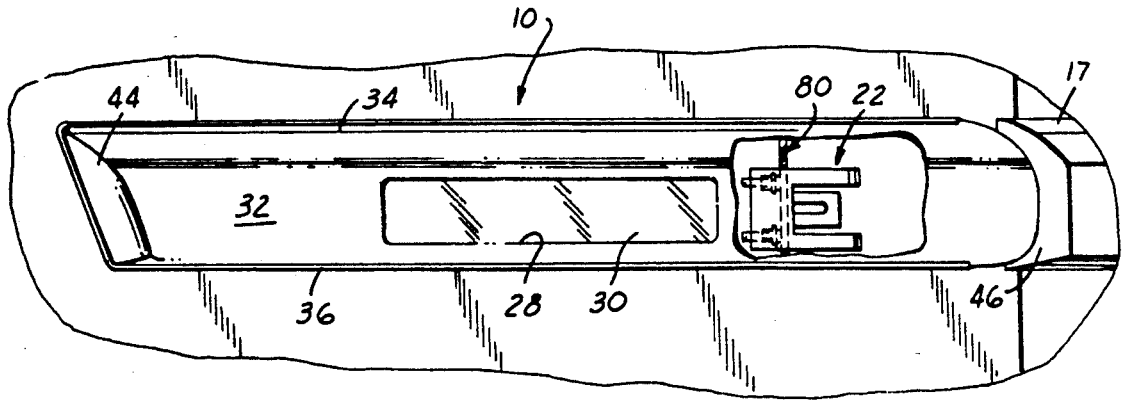
FIG. 4 is an enlarged view of the front fender spring mounted molding of FIG. 1 with portions broken away for the purpose of clarity.

In operation, the molding 10 lies against body structures 24 and 134 in its normal at-rest position as shown in FIG. 2. When bumper element 16 is moved in the direction of arrow 90, contact with end portion 17 will cause molding 10 to deflect outwardly thereby permitting passage of the bumper end portion 17 therebeneath without damage to the molding or damage to the automobile body. As the molding 10 is deflected, the portion nearest the bumper end portion 17 will swing in a fairly wide arc as shown in FIG. 6 Deflection of molding 10 is accompanied by deflection of the spring arms of spring clip 50. The spring arms 76, 77 slide in the slot 86 thus permitting the molding 10 to deflect as shown in FIGS. 3 and 6. Spring mechanism 26 serves to permit lesser pivoting of the end of molding 10 remote from the bumper element 16. The remote end point 136 (FIG. 2) of the molding 10 acts as a pivot center. As will be noted in FIG. 5, the wall 120 moves in what is essentially a straight line and thus it is not required that the remote end point 136 be longitudinally movable. The fact that the spring arm 96 can't flex aids in defining this path. It is not desired that the end point 136 of molding 10 be longitudinally movable, otherwise the molding would slide along the surface of the body structure and cause damage. When the bumper element 16 is retracted to its normal position, molding 10 is also returned to the normal position shown in FIG. 2 as a result of the spring bias.

We claim:

1. In a spring mounted molding for a vehicle having a body with a forward end and a rearward end, a bumper mounted on one of the forward and rearward ends thereof, energy absorbing structure mounting the bumper to the vehicle, said energy absorbing structure biasing the bumper to a normal position but permitting movement of the bumper towards the vehicle upon impact, said bumper having an end portion extending around a side of the vehicle body, said spring mounted molding comprising a relatively rigid element having an underside and an exterior side, spring means on the underside of the molding, said spring means being connected between the molding and the vehicle with the molding lying on an exterior of the vehicle body in alignment with, and adjacent to, said bumper end portion, said spring means biasing the molding closely adjacent to the vehicle body, the molding having a camming surface adjacent to the bumper end portion, the bumper end portion having a mating camming surface adapted to contact the molding camming surface and to move to the underside of the molding when the bumper is moved towards the vehicle upon impact, with said molding moving away from the vehicle body against the action of said spring means, said spring means being effective to bias the molding back to an original position thereof upon retraction of the bumper end portion, said spring means being fixedly anchored to one of the vehicle and the molding and slidably anchored to the other of the vehicle and the molding, said spring means comprising a pair of spring mechanisms, one of said spring mechanisms being positioned remotely from said bumper end portion and being fixedly anchored to both the vehicle and molding, the other of said spring mechanism being positioned between said one spring mechanism and the bumper end portion, said other of said spring mechanisms being fixedly anchored to the vehicle and slidably anchored to the molding, the improvement comprising said other spring mechanism including a wall member provided on the underside of the molding, the wall member having a slot therein, and a substantially U-shaped flat spring member having two free ends with one free end fixedly anchored to the vehicle and the other free end extending through said slot in slidable relationship therewith to provide said slidable anchor.

2. The structure of claim 1 wherein a tang structure is provided adjacent to said other free end of the spring member to prevent withdrawal of said other free end of the spring member from said slot.

3. The structure of claim 1 wherein the spring member includes a separate spring section which bears against the wall member to provide pressure contact between the spring member and molding.

4. The structure of claim 1 wherein said one spring mechanism includes a second wall member provided on the underside of the molding, the second wall member having a slot therein, a substantially U-shaped flat spring member having a pair of spring arms, a web connecting the spring arms together at one end, one of the spring arms being fixedly anchored to the vehicle, the other spring arm having a free end extending through said last mentioned slot, and means fixedly anchoring the other spring arm to the second wall member in said last mentioned slot.

5. The structure of claim 4 wherein the means fixedly anchoring said other spring arm to the second wall member comprise a tang structure on said other spring arm on each side of the second wall member.

* * * * *